US007028190B2

(12) United States Patent
Burakoff et al.

(10) Patent No.: US 7,028,190 B2
(45) Date of Patent: Apr. 11, 2006

(54) METHOD AND SYSTEM FOR ELECTRONIC DELIVERY OF SENSITIVE INFORMATION

(75) Inventors: Stephen V. Burakoff, Chestnut Hill, MA (US); Sergiu S. Simmel, Brookline, MA (US); Robert A. Fein, Newton, MA (US); Alex Magary, Andover, MA (US); Garett Wiley, Marblehead, MA (US); Leonard Driscoll, Andover, MA (US)

(73) Assignee: NewRiver, Inc., Andover, MA (US)

( * ) Notice: Subject to any disclaimer, the term of this patent is extended or adjusted under 35 U.S.C. 154(b) by 969 days.

(21) Appl. No.: 09/989,240

(22) Filed: Nov. 20, 2001

(65) Prior Publication Data

US 2002/0065896 A1    May 30, 2002

Related U.S. Application Data

(63) Continuation-in-part of application No. 09/023,039, filed on Feb. 12, 1998.

(51) Int. Cl.
*H04L 9/00* (2006.01)
(52) U.S. Cl. .................. 713/182; 713/200; 713/201
(58) Field of Classification Search ................ 713/182, 713/200, 201
See application file for complete search history.

(56) References Cited

U.S. PATENT DOCUMENTS

| 5,270,922 A | 12/1993 | Higgins |
| 5,315,634 A | 5/1994 | Tanaka et al. |
| 5,457,746 A | 10/1995 | Dolphin |
| 5,502,637 A | 3/1996 | Beaulieu et al. |
| 5,513,126 A | 4/1996 | Harkins et al. |
| 5,590,325 A | 12/1996 | Kolton et al. |
| 5,689,650 A | 11/1997 | McClelland et al. |
| 5,790,790 A | 8/1998 | Smith et al. |
| 5,819,271 A | 10/1998 | Mahoney et al. |
| 5,864,871 A | 1/1999 | Kitain et al. |

(Continued)

FOREIGN PATENT DOCUMENTS

WO    WO 96/18963 A1    6/1996

(Continued)

OTHER PUBLICATIONS

Bolton, D.W. et al."Receipt of Solicited and Unsolicited Documents in a Distributed Communication System, Oct. 1980." IBM Technical Disclosure Bulletin, vol. 23, No. 5, Oct. 1980, pp. 2129-2134, pp. 1-6.

(Continued)

*Primary Examiner*—Thomas R. Peeso
(74) *Attorney, Agent, or Firm*—Wolf, Greenfield & Sacks, P.C.

(57) ABSTRACT

A method and related system obtains consent from a user for electronic delivery of sensitive information. The user operating a first computer accesses a web page on a server system to input the consent. The web page prompts for the consent from the user. Once the consent is received at the server system, the consent is stored and sensitive information is delivered electronically to an e-mail address specified by the user. Once consent is indicated, it is communicated from the individual's computer to another computer such as a server over, for example, a modem connection. Having secured the individual's consent, the additional sensitive information may be delivered to the individual's computer as, for example, a URL attachment to an email message.

61 Claims, 9 Drawing Sheets

U.S. PATENT DOCUMENTS

| | | |
|---|---|---|
| 5,893,079 A | 4/1999 | Cwenar |
| 5,918,218 A | 6/1999 | Harris et al. |
| 5,926,792 A | 7/1999 | Koppes et al. |
| 6,122,635 A | 9/2000 | Burakoff et al. |
| 6,192,407 B1 | 2/2001 | Smith et al. |

FOREIGN PATENT DOCUMENTS

| | | | |
|---|---|---|---|
| WO | WO 97/15018 A1 | 4/1997 | |
| WO | WO 98/07085 A1 | 2/1998 | |
| WO | WO 98/26386 A1 | 6/1998 | |
| WO | WO 98/33131 A1 | 7/1998 | |
| WO | WO 99/22327 A1 | 5/1999 | |
| WO | WO 99/41688 A1 | 8/1999 | |
| WO | WO 99/41689 A1 | 8/1999 | |

OTHER PUBLICATIONS

Information on Travelers Life & Annuity Company's Universal Annuity products including packaging for shipping a 3.5 inch computer diskette containing InUnity Corporation's technology (8 pp), and including an article dated May 1997 that announces a program related to the Travelers Universal Annuity products and that identifies InUnity Corporation as providing the technological support for the program (2 pp). Electronic Data Gathering, Analysis, and Retrieval (EDGAR)—EDGAR Filter Manual: Guide for Electronic Filing with the U.S. Securities and Exchange Commission by U.S. Securities and Exchange Commission, Washington, D.C., EDGAR Release 5.30, Aug. 1997.

"Filing EDGAR—Reference Guide for EDGAR Filers" by RR Donnelley Financial, Jan. 1997, pp. 3-30, Appendix A, Appendix B, Appendix C and Appendix D.

InUnity Corporation Web Site (www.Inunity.com), 19 pages printed on Jan. 21, 1998.

InUnity Corporation's Products and Services, 11 pp, Sep. 1997.

InUnity Corporation's Corporate Overview, 12 pp, May 1997.

"The Fund Profile—A White Paper" by Robert A. Fein of InUnity Corporation, 13 pp, Apr. 1997.

CUSIP Web Site (www.cusip.com), 13 pages printed on Feb. 7, 1998.

Information on ReliaStar Life Insurance Company's Select*Life products including packaging dated Sep. 1997 for Shipping a 3.5 inch computer diskette containing InUnity Corporation's technology (4 pages), and including an article dated Nov. 24, 1997 that announces the availability of digital prospectuses for the Select*Life products and that identifies InUnity Corporation as the developer of the technology (2 pp).

PricewaterhouseCoopers Technology Centre, EdgarScan, An Intelligent Interface to the SEC EDGAR Database, 1999 PricewaterhouseCoopers, 2 pp.

Edgarscan Beta Release (fwd), Sept. 8, 1996, 2 pp.

Global Securities Information Home Page, http://www.gsionline.com 9 pp.

"LLRX-A Comparison of SEC Filing Sources," (www.llrx.com/features/sec.htm), May 22, 1997, 5 pp.

Horan, Thomas F.; Electronic Bill Presentment and Payment: The Next Step for the E-Commerce Market; pp. 10-20; The Journal of Electronic Commerce.

Ferguson, D., "Parsing Financial Statements Efficiently and Accurately Using C And Prolog", Proceedings of the Fifth International Conference on the Practical Application of Prolog, Proceedings FO PAP97. Practical Application of Prolog. Fifth International Conference London, UK, Apr. 22-24, 1997, pp 157-167.

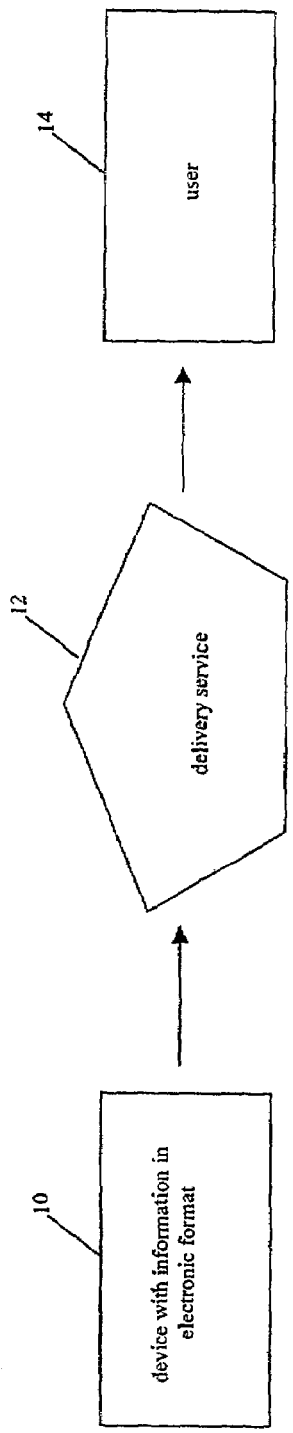
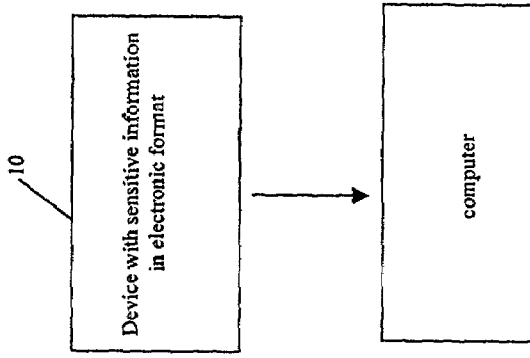

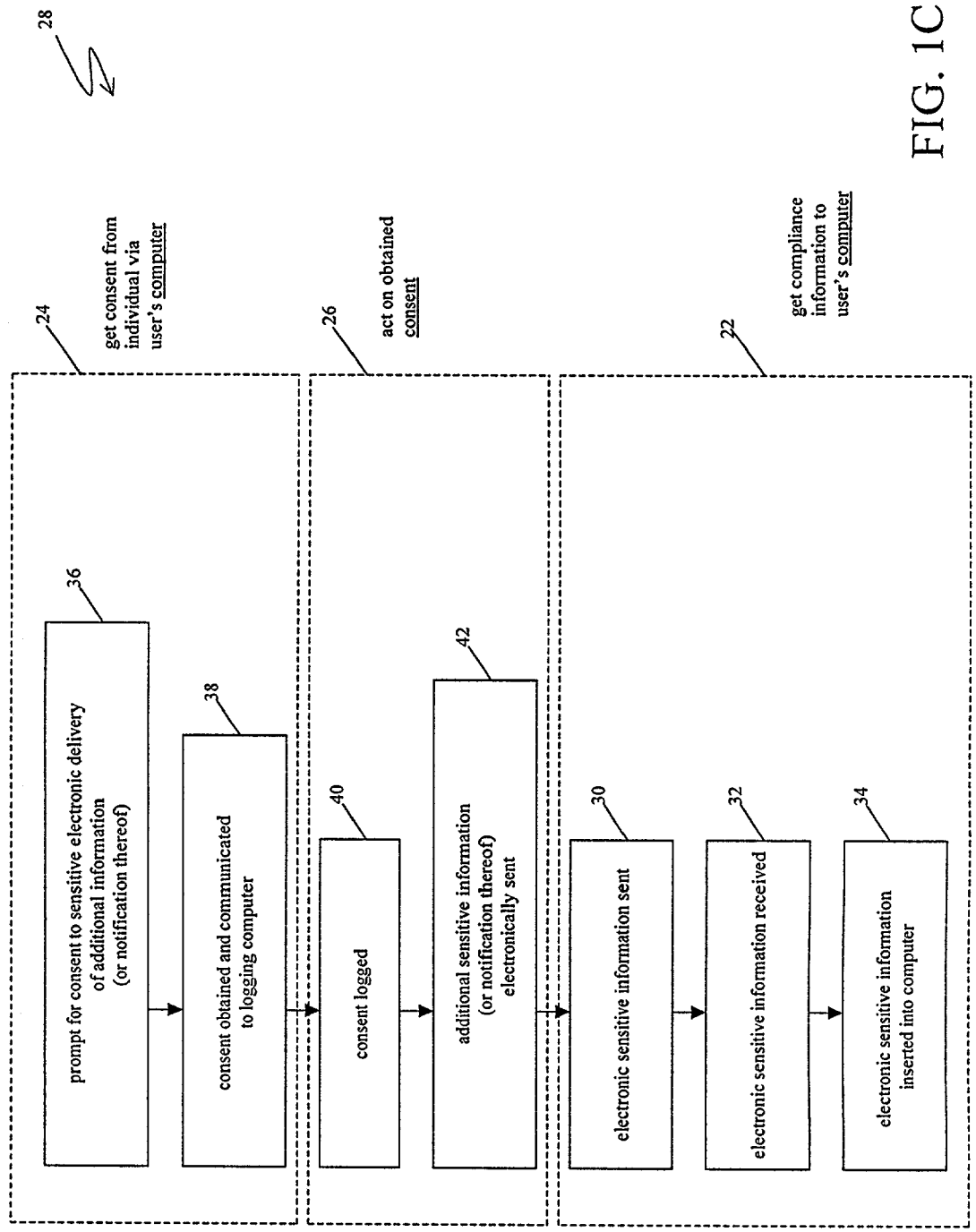

METHOD AND SYSTEM FOR ELECTRONIC DELIVERY OF SENSITIVE INFORMATION

RELATED APPLICATIONS

This application is a continuation-in-part of co-pending and commonly owned U.S. patent application Ser. No. 09/023,039, filed Feb. 12, 1998, which is herein incorporated by reference in its entirety.

FIELD

This invention relates to obtaining consent from a user to the electronic delivery of sensitive information.

BACKGROUND INFORMATION

Many government agencies, regulatory bodies or private organizations require that individuals be provided with certain information at specific times. For example, the Securities and Exchange Commission (SEC) requires that certain individuals, such as prospective and existing investors, be delivered specific information about investment vehicles such as, for example, mutual funds. In the context of a prospective investor planning to invest in a particular mutual fund, for example, a mutual fund prospectus must be shown to have been delivered to the prospective investor in such a way that the prospective investor was provided with adequate notice of and access to the prospectus in accordance with SEC regulations. These delivery, notice and access requirements may be met, for example, by sending a copy of the prospectus to the prospective investor via the U.S. Postal Service. Similarly, other organizations have requirements that mandate similar information disclosure under an analogous procedure.

Delivering information on paper with hard copies of documents required to be sent to individuals (e.g., "sticker updates" to mutual fund prospectuses) is a time consuming and costly endeavor for companies and organizations. Printing and mailing costs alone can amount to millions of dollars per year.

Recently, certain organizations have begun to indicate that documents containing sensitive information may be distributed in electronic format with the caveat that any electronic delivery must meet at least the organization's electronic delivery requirements. Furthermore, Congress has passed, and the President has signed into law the Electronic Signatures in Global and National Commerce Act (ESIGN) giving legal validity to documents executed by electronic means that meet certain requirements. ESIGN further outlines standards for obtaining consent from a consumer for the electronic delivery of documents required to be provided to a consumer in writing.

SUMMARY OF THE INVENTION

One embodiment of the invention is directed to a method of obtaining consent to electronically send sensitive information to a user. The method includes: electronically providing computer-executable instructions for obtaining consent from the individual for subsequent computer-aided delivery of the sensitive information to the individual; prompting, by execution of the instructions on a first computer, the individual for consent to the subsequent computer-aided delivery of the sensitive information to the individual; communicating the individual's consent from the first computer to a second computer, the second computer connected to the first computer over a network; and transmitting the sensitive information from the second computer to the first computer.

Another embodiment of the invention is directed to a system for obtaining consent to electronically send sensitive information to a user. The system includes a server that is programmed to: send the communication to a user, the communication including instructions for a user to consent to electronic delivery of sensitive information; receive consent from the user; store the received consent; and cause sensitive information to be sent to the user.

Another embodiment of the invention is directed to a computer program including: a computer readable medium; computer program instructions on the computer readable medium, the program instructions, when executed by a computer, direct the computer to perform a method of obtaining consent to electronically send sensitive information to a user, the method comprising: requesting the consent from the user; receiving the consent from the user; and storing the received consent.

A further embodiment of the invention is directed to a computer-implemented method of obtaining consent for electronic delivery of sensitive information, the method comprising: identifying the user; obtaining the user's consent to receive sensitive information in electronic format; determining whether the user is capable of receiving sensitive information in electronic format; and providing the user with access to sensitive information in electronic format.

The application includes still further embodiments of the invention as defined by the claims.

BRIEF DESCRIPTION OF THE DRAWINGS

In the drawings, like reference characters generally refer to the same parts throughout the different views.

FIG. 1A is a diagram of the physical delivery of sensitive information in a computer-readable format to an individual;

FIG. 1B is a diagram showing access of the sensitive information by a computer operated by the individual and showing consent being provided electronically from the individual's computer to another computer such as a server;

FIG. 1C is a flowchart of steps involved in obtaining consent from the individual using the structures of FIGS. 1A and 1B according to an embodiment of the described method;

DESCRIPTION

Figure 2:
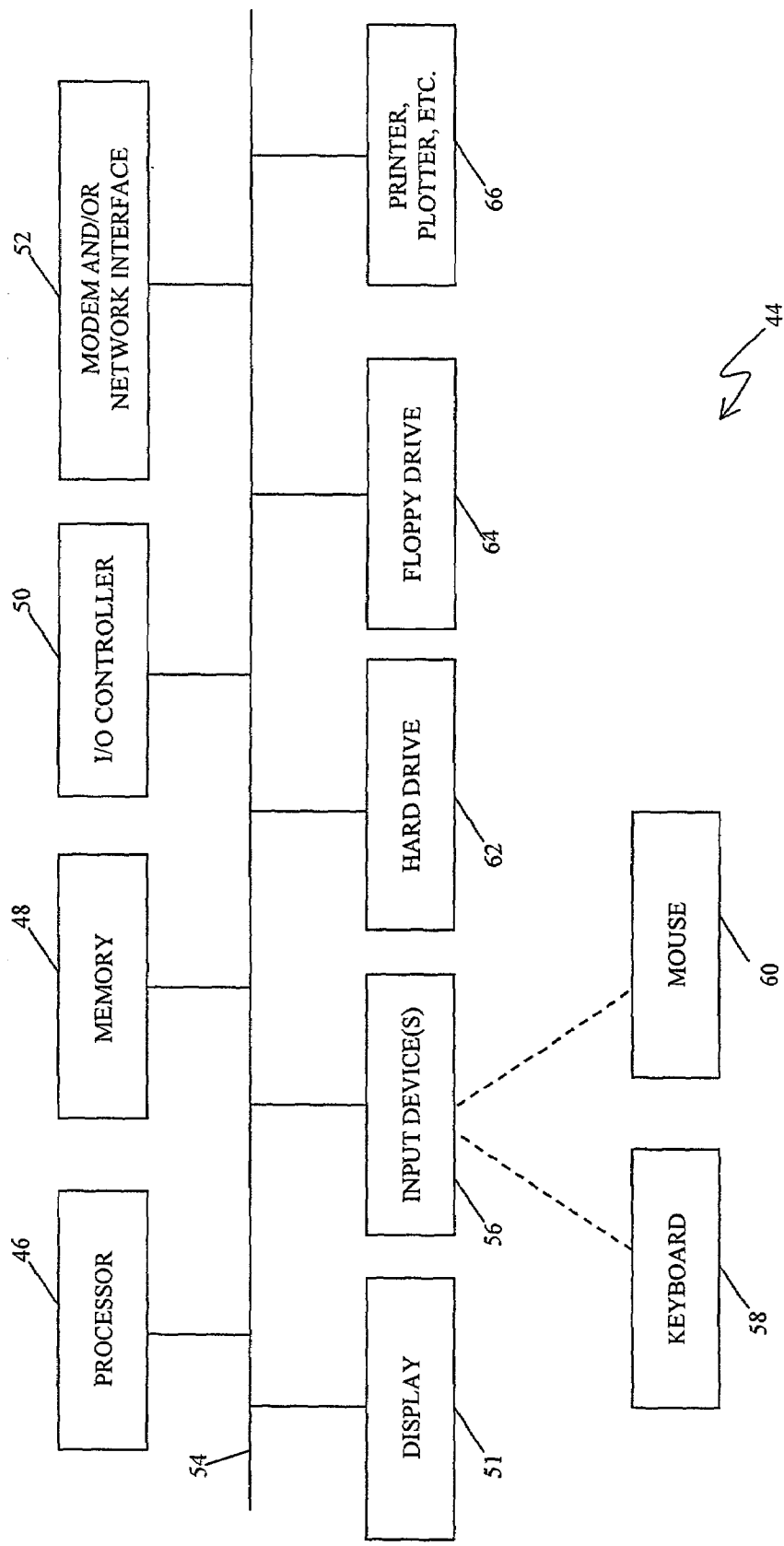
FIG. 2 is a block diagram of a general purpose computer according to the prior art for use with the method.

As used herein, the term "sensitive information" is intended to mean any information or data that government regulators or other organizations require or suggest be provided to certain individuals. There may also be a requirement that this information be provided in a certain manner or with certain restrictions. Government regulators may include, for example, the SEC, similar state or national entities in the U.S. or abroad, e.g., the National Association of Securities Dealers (NASD), state securities commissioners, state insurance commissioners, etc.

Other organizations may include, for example, lending institutions, medical offices, insurance companies, and educational institutions. These or other organizations may require that consent be obtained from a user before certain sensitive information may be sent to the user electronically. Examples of this kind of sensitive information may include investment information, credit card information, tax documents, contracts, mortgage documents, medical documents, etc.

One method of delivering sensitive information electronically includes sending the sensitive information to the user on a computer readable storage device. Referring to FIG. 1A, a computer-readable storage device 10 is sent via a delivery service 12 to a user 14. As an alternative to the delivery service 12, the user 14 may directly receive the device 10 by in-person hand delivery. The device 10 may be any computer-readable data storage unit such as a computer diskette, a CD, or a memory card. In one aspect of the present invention, the device 10 is a 3.5 inch computer diskette. The device 10 may contain sensitive information in a format that is readable by a computer. In addition to the sensitive information, the device 10 also may contain computer-executable instructions (software) for causing the computer to prompt the user 14 for consent to the electronic delivery of additional information to the user 14 and for causing the computer to forward the consent to another computer. The device 10 may also contain instructions for causing the computer to prompt the user 14 for the user's interest in possibly receiving future information electronically. The computer may also forward the user's response to another computer.

The delivery service 12 may be any of a variety of services that physically deliver packages and letters from one location to another including the U.S. Postal Service, United Parcel Service, or Federal Express. As mentioned previously, the delivery may also be accomplished in person.

Referring to FIG. 1B, with the device 10 in hand, the user 14 can load it into a computer 16. The computer 16 may read the information stored on the device 10 and display it to the user 14. While it is possible for the computer 16 to use any of a variety of text editors, word processors, browsers, or other software to display the compliance information on the device 10 to the individual, in one example the computer 16 uses "micro browser" software stored on the device 10 along with the compliance information. The micro browser software allows the user 14 at the computer 16 to review and/or search the information. The micro browser may provide a variety of useful features to the user 14 reviewing the information including hypertext links to other information and/or to sites on the World Wide Web.

In addition to the micro browser, or as part of the micro browser software, software on the device 10 may be loaded into the computer 16 and executed on the computer 16 to prompt the individual 14 for his or her consent to the electronic delivery of additional sensitive information. The electronic delivery of sensitive information also could be a computer notification of the existence of additional sensitive information. Once the individual 14 responds to the prompt and indicates his or her consent, the software causes the computer 16 to communicate that consent electronically over a computer communications link 18, e.g., a computer network such as the Internet, or the telephone system, to another computer 20.

The computer communications link 18 between the individual's computer 16 and the other computer 20 is depicted as a "cloud" in FIG. 1B to indicate that it may be any of a variety of mediums over which two computers may transfer data. In the example, the other computer 20 is a server that receives and logs the consent sent from the individual's computer 16. The other computer 20 may be maintained by, for example, the sender or originator of the information stored by the device 10 or the other computer 20 may be a system on which multiple sensitive information documents are stored along with records of individuals' consents. This logging computer 20 would then be a clearinghouse for information and consent storage. The originator of the information (e.g. a financial institution) may be different from the sender of the information (e.g. an information clearinghouse).

The user may be someone who needs sensitive information (such as the potential purchaser of a security) and has a personal computer (individual's computer 16). The other computer 20 may be a server maintained by an entity who distributes sensitive information (such as a clearing house who has a contract with financial institutions to publish security information, or the financial institution itself). If the user gives consent then the entity (on behalf of the financial institution) gives the user access to the sensitive information electronically.

The logging computer 20 may implement a sensitive information and consent database with a relational database accessed by SQL. Any one of a number of commercially available relational databases and languages can be used, for example, Microsoft SQL Server 7.0. As is known, a relational database implements a number of tables that are cross-referenced by one or more indices. One example of this type of database is Oracle 8*i*.

The scope of the consent requested of the user 14 may vary. The range of requested consent varies depending on, for example, the type of information stored by the device 10 and the sender or originator of the particular information. The user may be requested, for example, to consent to the electronic delivery of all information from the particular sender or originator, to consent to the electronic delivery of only certain categories of information from a particular sender or originator, or to consent to electronic delivery of just one particular piece of information. Also, the scope of the consent may be broad enough to cover the electronic delivery of information from more than one sender or originator.

Whatever the specific consent requested and given and then communicated to the other computer 20, the user 14 will then sometime in the future receive, by electronic delivery, the additional information. The information may be sent from the other computer 20 to the user's computer 16 as a file attachment to an email message. A notification also may be sent from the other computer 20 to the user's computer 16 as an email message having the address (Uniform Resource Locator or URL) of a Web page on the World Wide Web where the information is posted. A URL is a standard way that has been developed to specify the location of a resource that is available electronically. A URL is most commonly used when using a World Wide Web (WWW) client to link to WWW pages. The first part of the URL identifies the protocol that is being used. Typically, in WWW applications, HyperText Transfer Protocol (HTTP) is used. In addition, one application of a URL is a hyperlink. A hyperlink is an element in an electronic document that links to another place in the same document or to an entirely different document. Typically, a user clicks on the hyperlink to follow the link. This email message can also include a note to the user 14 that he or she should view the information by a certain date.

What is sent to the user may be the link on which the user can click to go to the web page that has the sensitive information. The sensitive information may also be stored on the server of a company that hosts the information, for example a company which distributes compliance information (e.g., mutual fund prospectuses) for financial institutions.

Thus, in accordance with at least one example of the present invention, physical delivery of the diskette 10 to the user 14 may be used as a mechanism to obtain consent from the user 14 for future electronic delivery of at least some additional sensitive information.

The device 10 may include sensitive information and the software necessary to at least obtain consent from the user 14 via the computer 16 and then communicate the obtained consent to the other computer 20. The software on the device 10 may also include the micro browser that may be executed on the user's computer 16 to cause it at least to display the sensitive information and the additional sensitive information after that is received at the user's computer 16 pursuant to the consent given by the user 14. The methods of making computer-readable storage devices are well known and thus are not described herein. Also, the technology to store software and data generally on such devices is available and thus is not described herein.

Referring to FIG. 1C, at least one aspect of the invention relates to a method 28 having the general steps of providing information to the user's computer 16 (step 22), obtaining the user 14 to consent to the electronic delivery of additional sensitive information (step 24), and acting on that consent once given (step 26). More particularly, in this aspect, the method 28 involves sending the diskette 10 to the user 14 (step 30) which is received by the user 14 (step 32) and inserted into his or her computer 16 (step 34).

In further embodiment step 24 occurs before step 22. In this embodiment a user is first prompted for consent to electronic delivery 36 before any electronic delivery 22 takes place. In this embodiment the logging of the consent 40 may at anytime in relation to step 22.

In another example of the present invention, the user 14 does not receive the information and/or software stored on a physical device 10 but instead uses his or her computer 16 to download the compliance information and/or software from a source. The source may be the other computer 20 or a different computer such as a server on the Internet.

Where the user 14 is not provided with a computer readable medium, the sensitive information maybe downloaded over a connection to the other computer 20 or a server. There are many different protocols known for the transferring of information from one computer to another, e.g., FTTP or HTTP, and any protocol may be used to implement this aspect of the present invention. Similarly, the micro browser software and the consent collection software may also be downloaded in this manner. Once downloaded to the computer 16, the user 14 may execute the micro browser to view the information and then execute the consent collection software to provide his or her consent to receiving subsequent information electronically.

Figure 3:
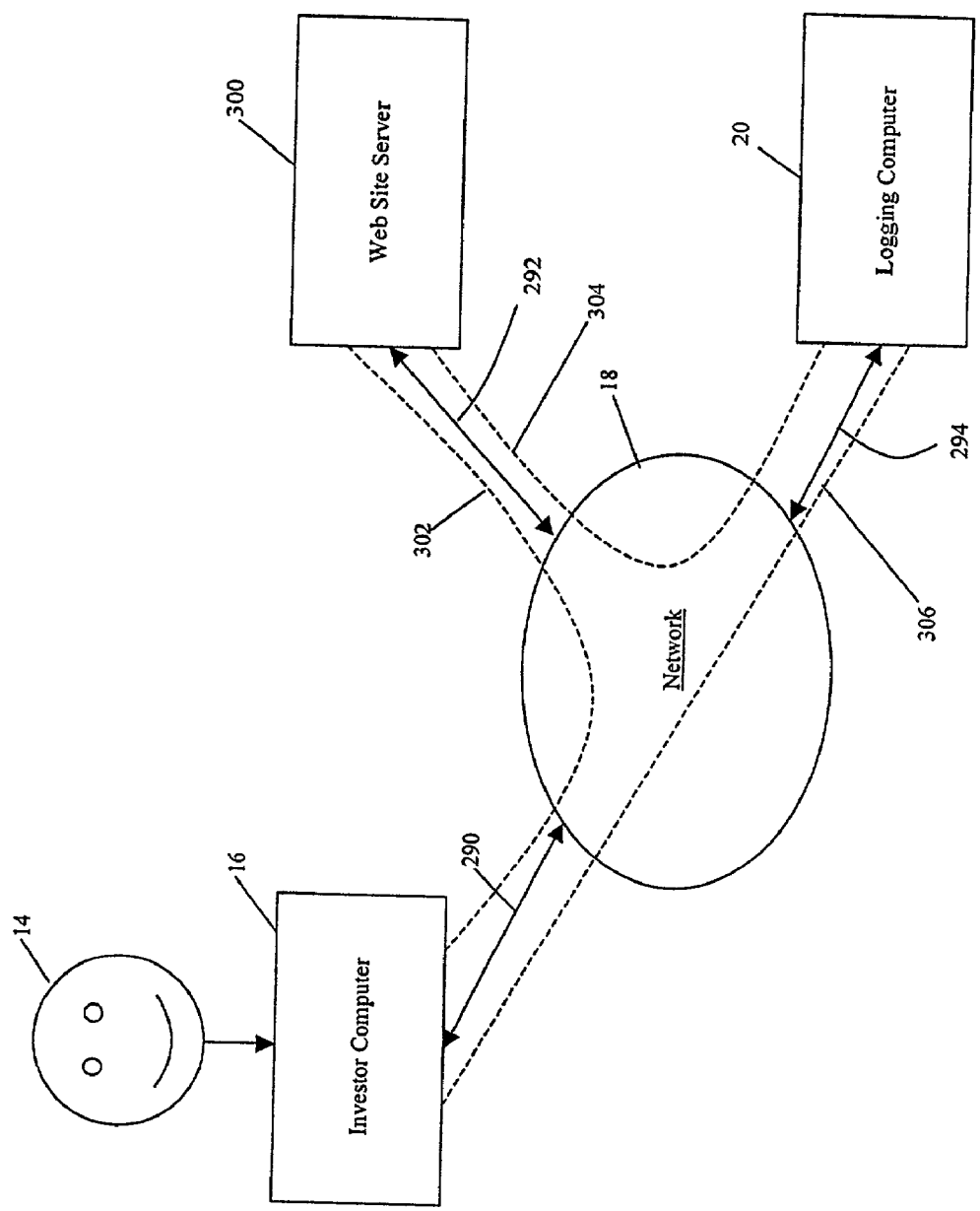
FIG. 3 is a diagram representing one embodiment of a method for a user to access sensitive information.

In another aspect of the present invention, the user 14 may operate the computer 16 to access a website server 300, as shown in FIG. 3. The investor's computer 16 accesses the network 18 through a communications channel 290 that may be, for example, a dial up connection, cable modem access or even wireless. The access would be through the communications network 18, e.g., the Internet, as shown conceptually by a dotted line 302. The website server 300, connected to the network 18 via a communications channel 292, would then present to the user 14 on the individual's computer 16 a web page, typically an HTML document, for the user 14 to complete and provide consent to the electronic delivery of additional compliance information, as will be discussed below. In other words, the user 14, using browser software, e.g., Microsoft Internet Explorer or Netscape Navigator, accesses a web page on the website server 300. After the website server 300 has received the completed consent information from the user 14, the received consent information is transmitted to the logging computer 20 through the communications network 18 via a communications channel 294. Of course, the communications channels 292, 294 would have bandwidth capacities sufficient to handle the amount of data traffic present on such servers. This communication between the website server 300 and the logging computer 20 is shown conceptually by the dotted line 304.

It should be noted that the broker/dealer web site server 300 and the logging computer 20 may be physically located near each other or operate in separate locations. Further, the logging computer 20 may be under the management of an entity separate from the website server. Still further, the logging computer 20 may be on a local area network (LAN) in communication with the web site server 300. In addition, the functions of the web site server 300 and the logging computer 20 may be supplied by a single server system having access to multiple databases. Also, the user's computer 16 may be a public terminal or kiosk that is set up to allow clients of an organization to access information relevant to them. As an example, this public kiosk may be placed in the lobby of a hospital and connected to the website through a network connection.

The logging computer 20, may operate as a sensitive information and consent storing clearinghouse, storing records of consents provided by users 14. The record in the logging computer 20 includes an identifier of the accounts for which consent to receive electronic delivery of sensitive information has been granted. As has been described, it is possible that consent may have only been granted for certain types of information to be delivered electronically. All of this data, however, may be maintained in the logging computer 20.

After the additional sensitive information becomes available and must be transmitted to the user 14, it will be transmitted from the logging computer 20 to the computer 16 of the user 14. This communication could be, for example, an e-mail transmission with an attachment sent through the communications network 18 along a path conceptually shown as a dotted line 306 through the network 18. Because the user 14 conducts business with the agency or organization and may be unaware of the separate entity of a sender any e-mail transmission sent to the user 14 may be marked as if coming from the agency or organization. Thus, any questions that the user 14 may have relative to the information may be directed to the agency or organization.

As described above, specific sensitive information sent to the user may include (but is not limited to) medical information such as a doctor's report, insurance information, security information such as a mutual fund prospectus, etc.

It should be noted that, as understood by one of ordinary skill in the art, an e-mail message is not necessarily directed to a particular computer. Rather, the e-mail message is directed to a specific destination address. With the proliferation of web-based e-mail services, the user 14 may access e-mail messages from almost any computer. Thus, the description of sending an e-mail message from logging computer 20 to the individual's computer 16 is an example where the user 14 accesses the e-mail account from the computer 16.

The logging computer 20, as above, stores the consent information as received from the user 14 through the website server 300. In addition, the logging computer 20 may store information. The information may be received from any one of a multitude of external databases.

Regardless of the manner in which the information and/or software arrives at the user's computer 16, the user 14 is prompted to consent to the electronic delivery of additional sensitive information or to consent to the electronic delivery of a notification of the additional sensitive information (step 36). The user 14 then may indicate consent by, for example, using a mouse of the computer 16 to click on an OK box displayed on a display of the computer 16, and the consent is communicated to the logging computer 20 (step 38). The logging computer 20 stores the consent received from the user's computer 16 (step 40), and the additional information or notification thereof that the user 14 agreed to accept electronically is sent to the user's computer 16 (step 42).

The various computers, i.e., the user's computer 16 and the logging computer 20, each may be a general purpose computer. Referring to FIG. 2, at least the basic components of a general purpose computer 44 typically include a central processor 46, a main memory unit 48 for storing software and/or data, an input/output (I/O) controller 50, a display device 51, a communications device 52 such as a modem or a network interface card, and a data bus 54 coupling these components to allow communication therebetween. The memory 48 generally will include random access memory (RAM) and read only memory (ROM). The computer 44 typically also has one or more input devices 56 such as a keyboard 58 and a mouse 60. The computer 44 typically also has a hard drive 62 with hard disks therein and a floppy disk drive 64 for receiving floppy disks such as the 3.5 inch diskette 10. Other devices also may be part of the computer 44 including output devices 66 (e.g., printer or plotter) and/or optical disk drives for receiving and reading digital data on a CD. In the disclosed example, one or more computer programs define the operational capabilities of the computer 44. These software programs may be loaded onto the hard drive 62 and/or into the memory 48 of the computer 44 via the floppy drive 64 or the CD. The compliance data stored on the diskette 10 also may be loaded into the computer 44 via the floppy drive 64 or CD.

In one example, at least the executable version of the software (e.g., the micro browser) is made to reside on the hard drive 62, and it is executed by the individual 14 double-clicking an appropriate icon on the display 51 using the mouse 60. In general, the controlling software and all of the data utilized by the software are transferred from the diskette 10 and reside on one or more of the computer's storage mediums, such as the hard drive 62.

The general purpose computer 44 may be any computer or workstation (client or server) such as a PC or PC-compatible machine, an Apple Macintosh or a Sun workstation. Furthermore the computer may be a wireless or handheld device. The particular type of computer or workstation is not central to the invention. The invention may be implemented in a variety of ways including an all-hardware embodiment in which dedicated electronic circuits are designed to perform all of the functionality which the programmed computer can perform. One example of the invention is an implementation in software for execution on one or more general purpose computers such as PCs running a version of the Microsoft Windows operating system.

As discussed above, the sensitive information is transmitted to the user 14 on a medium such as a floppy disk or CD. As also discussed above, the sensitive information is provided to the user 14 electronically but not via a hand-delivered or mail-delivered format.

Figure 4A:
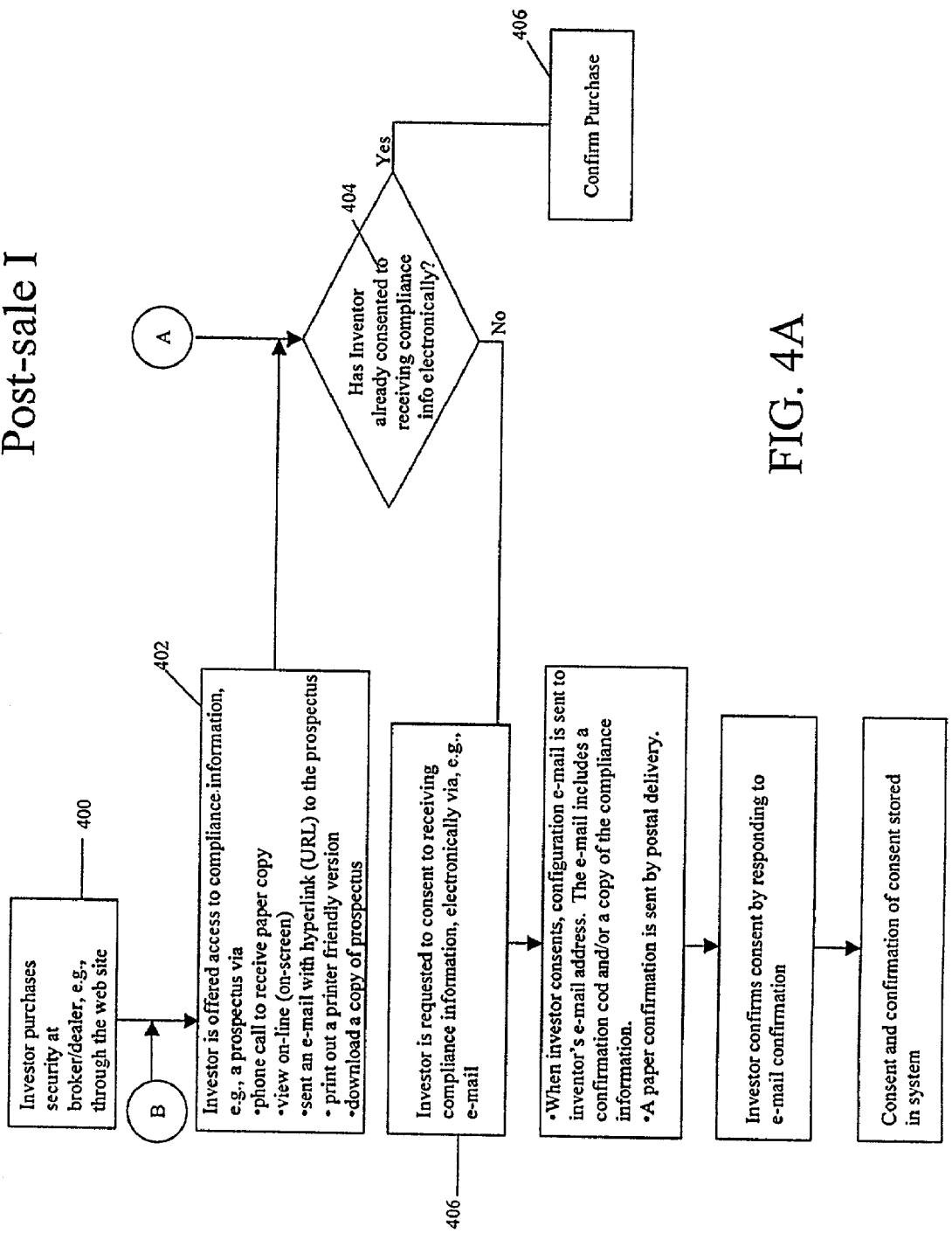
FIG. 4A is a flowchart of steps involved in obtaining consent from the user using the structure of FIG. 3 according to another embodiment of the method.

For purposes of explanation, accessing mutual fund prospectus is used as an example to illustrate one embodiment of the system. This example is not meant to be limiting, only illustrative. The systems and methods described herein may be used to access varying types of information and to satisfy requirements of different entities. In an exemplary transaction, the sensitive information in the form of compliance information is provided to a user in conjunction with a purchase of a security, e.g., shares in a mutual fund. Compliance information is information that the SEC requires investors receive in relation to certain securities transactions. As shown in FIG. 4A, at step 400, the user purchases the security at the broker/dealer, for example, through the website on a broker/dealer website server. To comply with the requirements of the SEC relative to providing a user with access to the prospectus for the mutual fund at the time of sale, the broker/dealer website server may offer the prospectus to the user in any of one or more different ways.

As shown in step 402, the broker/dealer website server may indicate to the user/investor that the prospectus is available in a hard copy (paper) format if the investor calls a phone number to request a delivery of the paper copy. Alternatively, the investor may be presented with a hyperlink (URL) pointing to the compliance information as stored on the logging computer 20. Further, the investor may be offered the option to have an e-mail sent to his/her e-mail address where the e-mail message includes a hyperlink (URL) pointing to the prospectus. In the case of the e-mail message, the URL may be pointing to the compliance information as it is stored on the logging computer 20. Finally, the investor may be offered the opportunity to print out a "printer-friendly" version of the prospectus.

The printer-friendly version of the prospectus is one that has been prepared specifically for proper output on a printer. Because the viewable area of a computer display monitor is different from that of a printed sheet, a printer-friendly version of a prospectus is one that has been adjusted so that the information is correctly viewable on a printed page. For example, a graphic image that is properly displayed on the monitor may have to be rotated and printed in a landscape view on a piece of paper so that the information may be read by the investor.

To comply with SEC requirements, the broker/dealer has to assure that the investor is given an opportunity to access the prospectus. Similar to the paper-based delivery of a prospectus, there is no way to confirm that the investor has actually read the prospectus or, if the investor does read the prospectus, there is no way to confirm that the investor understands what he or she has read. Thus, in order to comply with the SEC rules, it is only necessary for the broker/dealer to show that the prospectus was presented to the investor in such a way that it is clear that the investor saw that the prospectus was available and that the investor could access the information and the access is not utterly burdensome.

Of course, if the investor were to call to ask for a paper copy, a record of this may be maintained. Similarly, if the investor accesses the compliance information on-line or requests that an e-mail be sent with a hyperlink, this may also be recorded as evidence that the prospectus was delivered to the investor. Finally, a record may be kept indicating that the investor accessed the system to print out a printer-friendly version of the prospectus.

After the investor has been offered access to the compliance information, the broker/dealer website may access the logging computer 20 to determine if the investor already has consented to receiving compliance information electronically, step 404. If the investor has consented, control passes to step 406 where the purchase by the investor is confirmed. Because the investor has consented to receiving compliance information electronically, it also is possible that the confirmation of the purchase may be sent electronically.

If, however, the investor has not consented to receiving compliance information electronically, at step 406 the investor is requested to consent to electronically receiving additional compliance information in the future, for example, via e-mail.

After the investor has consented, step 408, a confirmation e-mail message maybe sent to the investor's e-mail address. This confirmation e-mail includes a specific confirmation code relative to the investor's consent. A paper confirmation of the investor's consent to electronic delivery of compliance information maybe mailed to the individual's postal address.

The investor confirms his/her consent by responding to the e-mail confirmation and including the confirmation code either in the subject line of the reply e-mail message or in the body of the response. Thus, the individual investor need only reply with a copy of the confirmation of the e-mail message because the confirmation e-mail message includes the confirmation code, step 410.

The investor's consent and evidence of the confirmation of consent are then stored in the logging computer 20 at step 412.

Figure 4B:
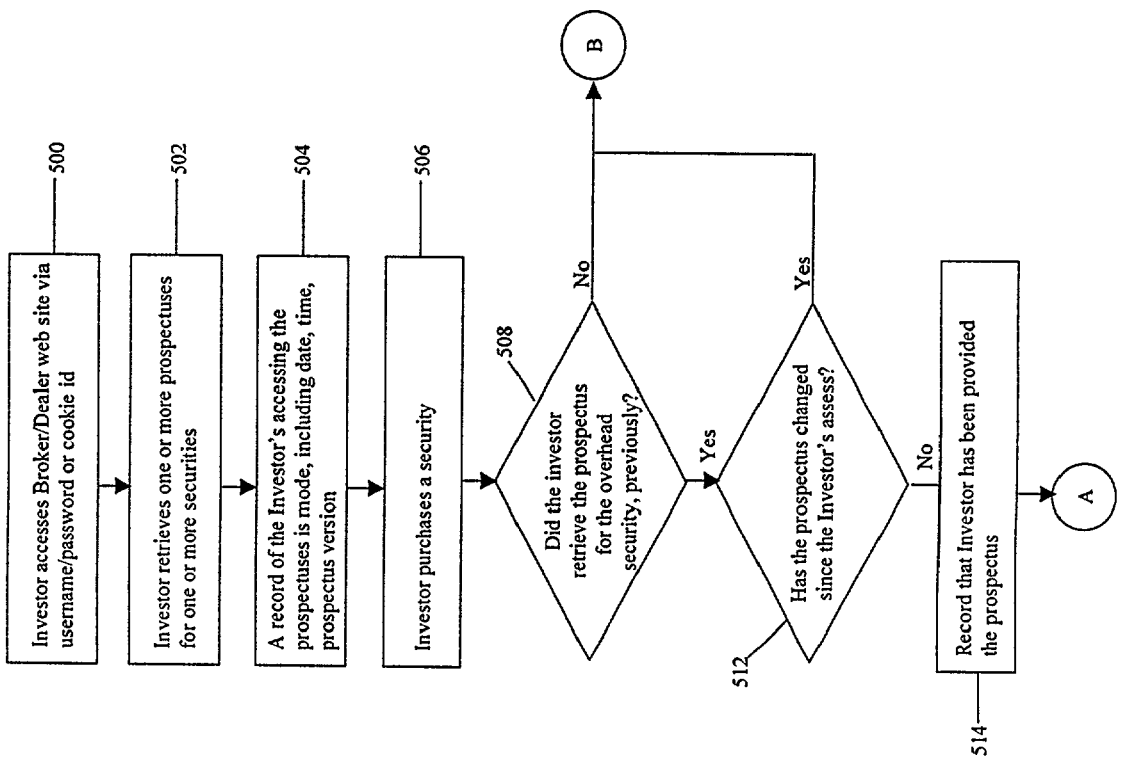
FIG. 4B is a flowchart of steps involved in obtaining consent from the user using the structure of FIG. 3 according to another embodiment of the method.

In another example, represented generally by the flowchart shown in FIG. 4B, the investor accesses the broker/dealer website service 300, step 500. The investor maybe identified to the broker/dealer website server as a registered user of the broker/dealer service either through the submission of a valid username/password pair or from cookies that have been left on the investor's computer 16.

A cookie is a message given to a web browser by a web server. The browser may store the message in a file called cookie.txt. The message maybe sent back to the web server each time the browser requests a page from the server. One purpose of a cookie is to identify a user of the browser software.

In one case, it can be assumed that the individual accessing the broker/dealer website server is verified because of the proper entry of the username/password pair. In the other case, however, there is no assurance that an individual operating the computer 16 is a verified user. Thus, the broker/dealer website server may either ask for the password associated with the individual identified by the cookie or simply ask for confirmation that the user is the person identified by the cookie. In either case, however, a specific identity of the investor is established.

At step 502, the investor can retrieve one or more prospectuses for one or more securities, as has been described above. A record of the investor's accessing of these prospectuses is made at step 504. This record is kept on the logging computer 20 because it is the system that is actually providing the prospectuses to the investor via the broker/dealer website server 300. The record includes an identification of the investor as passed along from the broker/dealer website server and includes, but is not limited to, the date, time, prospectus, prospectus version level and an identifier for the security. Thus, a record of each prospectus accessed by the investor is maintained.

Subsequently, the investor may purchase a security, step 506. After the investor has purchased the security, the logging computer 20, in conjunction with the broker/dealer website server will determine, at step 508, whether or not the investor previously retrieved the prospectus for the security that is being purchased. If the investor has not retrieved the prospectus, control passes to step 402, as shown in FIG. 4A, and the investor is provided with access to the prospectus in compliance with SEC rules.

Returning to step 508, if the investor previously has retrieved the prospectus for the purchased security, control passes to step 512 where it must be determined if the prospectus the investor retrieved was the most recent version available. If there has been a change, then control passes to step 402. If there has been no change in the prospectus, then at step 514, a record is made that the investor has been provided with the prospectus in compliance with SEC rules (and the investor is notified of this) and control then passes to step 404, as shown in FIG. 4A.

Figure 5:
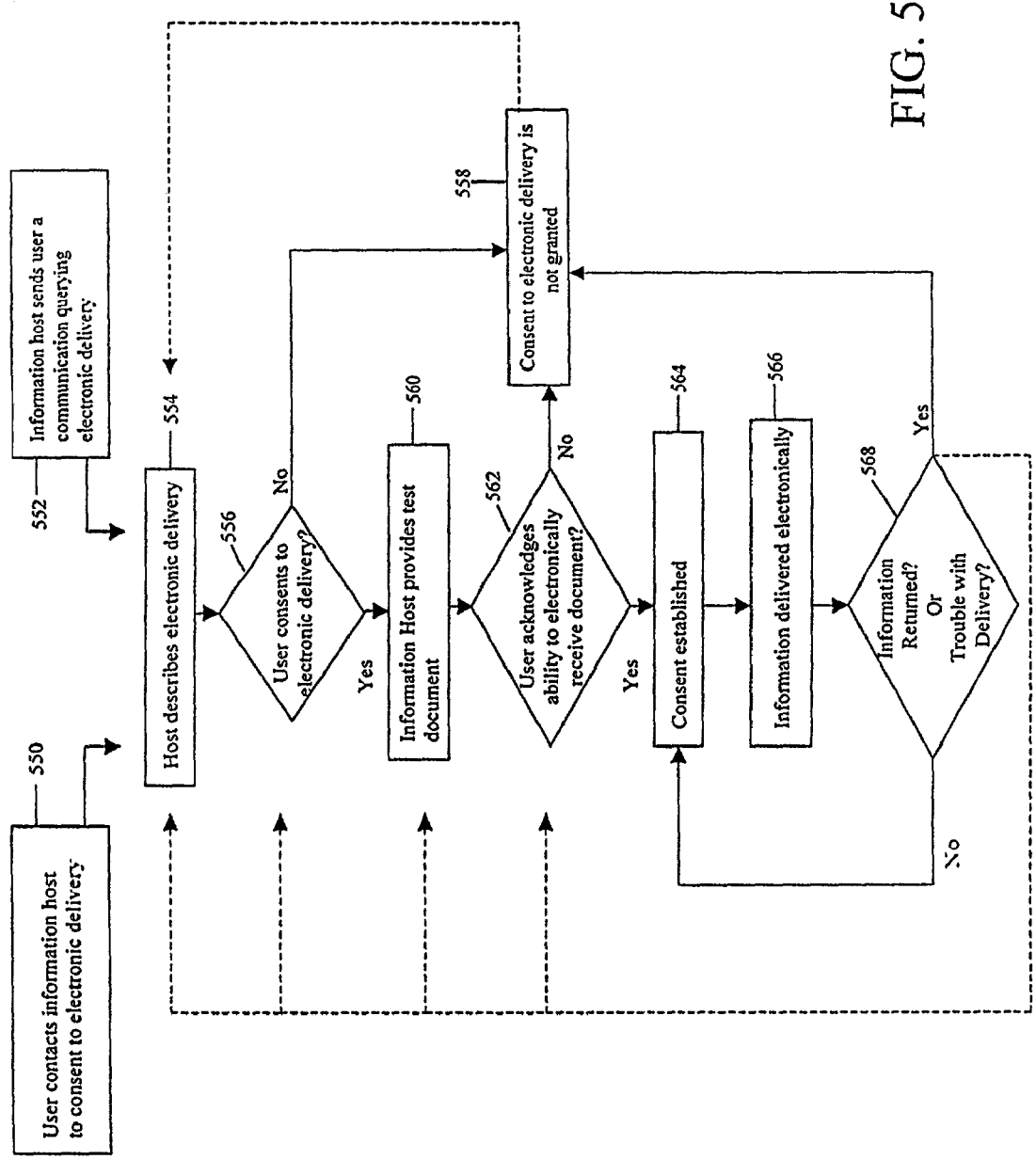
FIG. 5 is a flowchart of steps involved in obtaining consent from the user using the structure of FIG. 3 according to another aspect of the embodiment method.

The examples of FIGS. 4A and 4B depict the particular embodiment of a user obtaining compliance information for a potential investment. More generally, FIG. 5 depicts a series of steps involved in obtaining consent from a user for the delivery of non-specific sensitive information. The depictions of FIGS. 4A, 4B and 5 are exemplary only and other particular embodiments are possible. Referring to FIG. 5, electronic delivery of sensitive information may begin at step 550 when a user contacts a host for electronic delivery of sensitive information or at step 552 when an information host sends a user a query as to whether the user wishes to receive sensitive information in electronic format. In the second step of the process 554, the host describes the electronic delivery to the user. This step ensures that the user is aware of what is entailed in receiving sensitive information electronically. As described above, a URL may optionally be sent to a user in directing a user to the location of sensitive information rather than sending the user full electronic copies of sensitive information.

At step 556 the user decides whether or not to consent to electronic delivery. If the user does not consent then the process ends 558. If the user does consent to electronic delivery then the information host may send the user a test document 560. If the user is unable to receive the test document then the consent may not be granted 558, and the process may begin again. If the user is able to receive the test document then consent may be established by 564, and further sensitive information may be delivered electronically, 566.

If information sent by the host to the user is returned, or if there is trouble with the delivery, 568, then consent may be revoked 558 or the consent obtaining process may revert to a prior stage in order to reaffirm the user's valid consent.

Figures 6, 7:
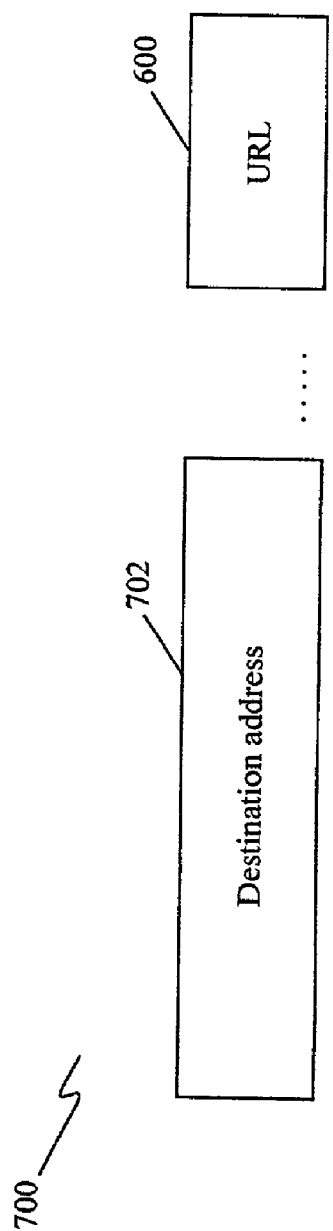
FIG. 6 is a diagram showing a format of a URL pointing to sensitive information.
FIG. 7 is a diagram showing a format for a signal representing an e-mail message with the URL of FIG. 6 attached.

The format of the URL pointing to the sensitive information is shown generally in FIG. 6. As shown, a URL character string 600 includes a protocol portion 602 indicating which protocol to use. As shown, the HTTP protocol is represented although this is an example only and the invention is not limited to this protocol. A domain name portion 604 identifies either an IP address or the domain name where the resource is located. A fictitious domain, "loggingcomputer.com," is shown. A file portion 606 represents the file "sensitiveinfo.html" that contains the sensitive information.

The URL character string 600 may be part of a transmission 700 as shown in FIG. 7. The transmission 700 may include a destination address portion 702 representing the destination address, or e-mail address, of the e-mail message to which the URL string 600 is attached.

As described above, an e-mail message is sent to the user 14. The e-mail message includes a hyperlink (URL) pointing to the user information as it is stored on the logging computer 20. As an alternative, the e-mail message may be prepared as a HyperText Markup Language (HTML) document that would present the sensitive information to the user 14 without the user 14 having to "click-on" or access a hyperlink. Providing the e-mail message as an HTML document means that the investor does not have to launch a web browser to read the information—the sensitive information may be reviewed within the e-mail program.

The HTML document may have additional hyperlinks embedded in it. These additional hyperlinks (URLs) may direct the user to a web page on the web server 300. This web page may present the user with links to even more information. As an example, the HTML document may be customized for the user by providing hyperlinks to the user's personal sensitive information. The HTML document may also include an embedded Javascript program to notify the logging system 20 when certain documents have been accessed by the investor. This notification may be stored as evidence of delivery and access of the sensitive information by the user.

Still further, the sensitive information may be sent as an attachment to the e-mail message. This attachment may be in any format, for example as an Adobe Acrobat file or a text file.

Certain organizations or rules may require that there be a record maintained that the sensitive information is delivered to the user. With the previous method of sending a paper copy of the sensitive information, it may only need to be shown that the information was mailed and there was no indication received back that the delivery was unsuccessful. Such an indication may be evidenced by returned or undeliverable mail, for example. Similarly, with the electronic or e-mail transmission of sensitive information, it may only need to be shown that the e-mail message was sent to the user 14. This evidence may be maintained on the logging computer 20. Of course, if the logging computer 20 were to receive back an indication that the delivery via e-mail was unsuccessful, then a backup method of sending the sensitive information (paper copy via postal delivery) may be implemented.

In an alternate embodiment, one or more of the communications channels 290, 292, 294 is a wireless connection to the network 18. In addition, hand-held wireless devices such as Personal Digital Assistants (PDAs) or telephones with micro web browsers may replace the user's computer 16 to receive the e-mails with the URLs to the sensitive information attached thereto. These devices may then be used to access the sensitive information. Of course, the format of the information for display on a hand-held device would differ from that meant to be displayed on the monitor of a desktop or laptop computer with a larger screen. In addition, the keypad on a hand-held device, especially a phone, will limit the amount and type of information that can be entered by the recipient.

Figure 8:
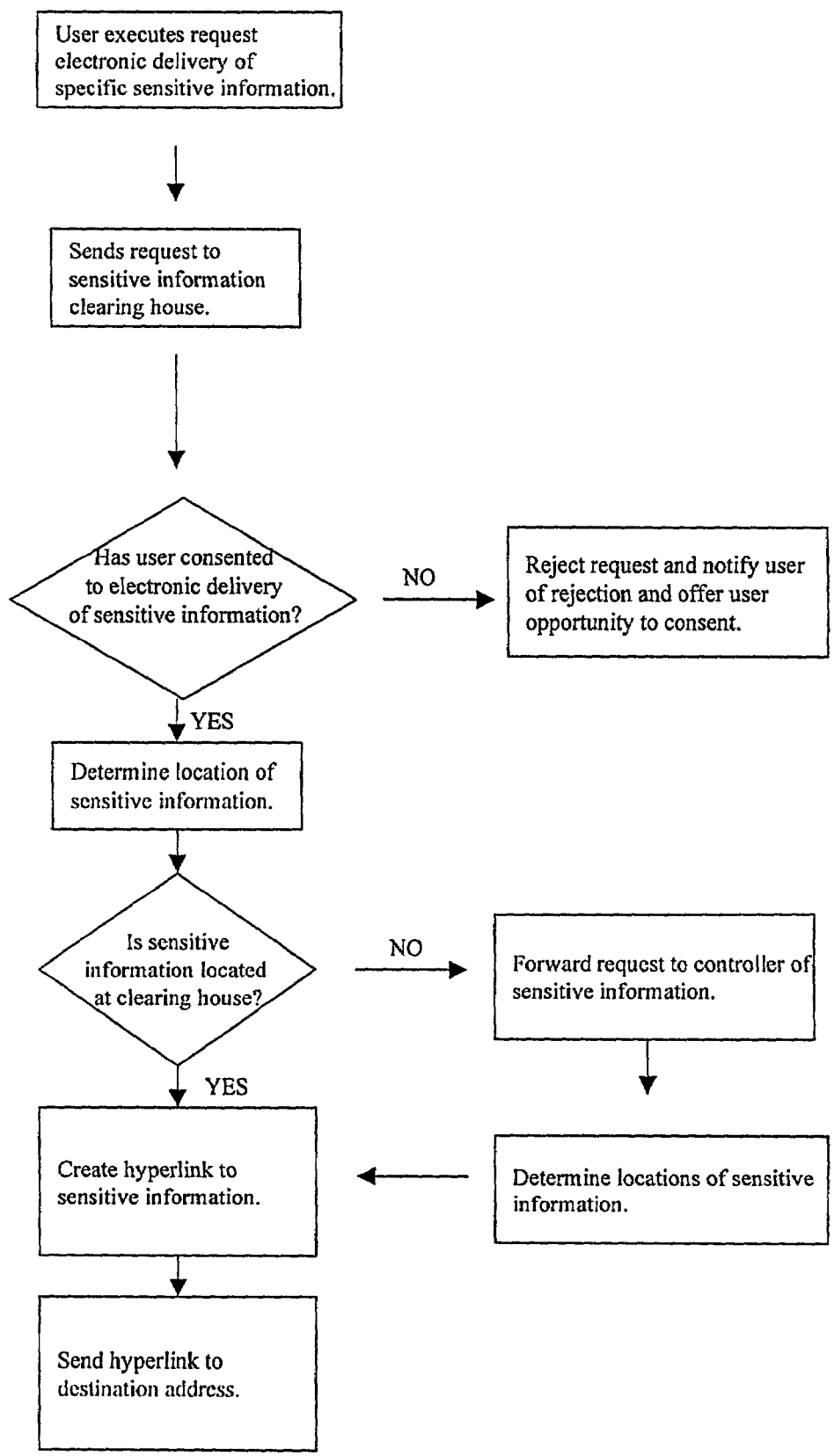
FIG. 8 is a flowchart of steps involved in a user requesting a link to specific sensitive information according to another embodiment of the method.

One embodiment for sending sensitive information to a user after the user has consented to electronic delivery of sensitive information is shown in FIG. 8. First the user executes a request for electronic delivery of specific sensitive information. That request is then sent to a sensitive information clearing house. As described above the sensitive information clearing house may be the entity responsible for the maintenance of the sensitive information or may be a different entity specifically contracted for the distribution of sensitive information to users (such as a company which contracts with financial institutions to electronically provide compliance information to potential investors). Once the request is received by the clearing house it is determined if the user has consented to electronic delivery of sensitive information. If the user has not consented, the users request for sensitive information is rejected and the user may be offered an opportunity to consent to electronic delivery of sensitive information.

If the user has consented to electronic delivery of sensitive information the location of the specific sensitive information requested by the user is determined. If the specific sensitive information requested by the user is not located at the clearance house the users request is forwarded to the controller of the specific sensitive information. Once the exact location of the specifically requested sensitive information is determined, the clearing house or controller of the specific sensitive information, generates a hyperlink which links to the specifically requested sensitive information. That hyperlink is then sent to the destination address which the user has indicated in either there initial request for the sensitive information or in a predetermined profile of the users requests.

As there is no way to know exactly how a user will be receiving and accessing these e-mails, one embodiment of the present invention may send multiple URLs for the same sensitive information. One URL will be directed to being viewed on a standard monitor with a fully enabled web browser and will be labeled as such. The other may be labeled as accessible via a hand-held device operating a micro web browser or equivalent. The latter URL may be configured to operate in conjunction with the hand-held device and may, for example, accept input via the keyboard. Sending the URL in multiple formats allows the recipient to view the sensitive information from, for example, the micro web browser on the wireless phone to see if immediate action is warranted. If the matter is not urgent, the user then may access the same data upon returning to the desktop or laptop computer via the alternate URL that is provided. Further, the URL may point to a version of the sensitive information that may be viewed on a hand-held device. Many applications are available to convert a document to a format that may be viewed on, e.g., a Palm device from Palm Computing or the Pocket PC from Hewlett-Packard and Casio.

The examples described above use e-mail messages to send the URLs pointing to the sensitive information in a database. In yet another example, instead of using e-mail, instant messaging (IM) software, one example of which is AOL Instant Messenger from America On Line, may be used to send the URL. With IM, one user has an indication of whether another user is actively on the network. If the other user is actively on the network, a message may be sent directly to the user without using an e-mail server or program. The transmission of the URL via the Instant Messaging operation may be integrated into the present system. Further, the consent may be established such that URLs are to be sent via IM, if the recipient is online, otherwise the message is sent via e-mail.

Unless specifically stated herein, it should not be assumed that any described particular aspect or element of the system is essential. Further, variations, modifications, and other implementations of what is described herein will occur to those of ordinary skill in the art without departing from the spirit and the scope of the invention as claimed. In addition, in view of the foregoing description, one of ordinary skill in the art will understand that equivalent structures may be available to achieve the same results as those described above. Accordingly, the spirit and scope of the following claims should not be limited to the descriptions of the examples described herein.

What is claimed is:

1. A method of obtaining consent to electronically send sensitive information to an individual, the method comprising:
   electronically providing computer-executable instructions for obtaining consent from the individual for subsequent computer-aided delivery of the sensitive information to the individual;
   prompting, by execution of the instructions on a first computer, the individual for consent to the subsequent computer-aided delivery of the sensitive information to the individual;
   communicating the individual's consent from the first computer to a second computer, the second computer connected to the first computer over a network; and
   transmitting the sensitive information from the second computer to the first computer.

2. The method as recited in claim 1, wherein the method further comprises electronically providing disclosure information regarding electronic delivery of sensitive information.

3. The method as recited in claim 1, wherein the electronically providing comprises sending an message over a network.

4. The method as recited in claim 1, wherein the electronically providing comprises sending a computer readable device.

5. The method as recited in claim 1, 3, or 4, wherein the electronically providing comprises sending a link which the user can follow to indicate consent.

6. The method as recited in claim 1, 3, 4, or 5, wherein the electronically providing comprises sending a link which points to a document containing sensitive information.

7. The method as recited in claim 1, 3, 4, or 5, wherein a user's ability to access sensitive information is recorded.

8. A system of obtaining consent to electronically send sensitive information to a user, the method comprising:
   under control of a server system:
      sending a communication to a first client system, the communication comprising computer executable instructions for obtaining a consent response from the user for electronic delivery of the sensitive information;
      receiving the consent response from the first client system;
      storing the consent response; and
      if the consent response is positive, causing the sensitive information to be electronically delivered the user.

9. The method as recited in claim 8, further comprising:
   under control of the server system:
      wherein the communication comprises a consent request form.

10. The method as recited in claim 9, further comprising:
    under control of the first client system:
       receiving the consent request form;
       displaying the consent request form;
       accepting data from the user for at least one field in the consent request form; and
       sending the accepted data to the server system.

11. The method as recited in claim 10, further comprising:
    under control of the server system:
       determining whether the data received from the first client system indicates consent to electronically send sensitive information to the user; and
       if the received data indicates consent, electronically sending sensitive information to the user.

12. The method as recited in claim 11, wherein the step of electronically sending sensitive information comprises at least one of:
    (i) sending a first e-mail message to a destination address associated with the user, the first e-mail message including a URL pointing to the sensitive information; and
    (ii) sending a second e-mail message to the destination address associated with the user, the second e-mail message including the sensitive information.

13. The method as recited in claim 8, 9, 10 or 11 wherein the server system and first client system communicate over a computer network.

14. A system for obtaining consent to electronically send sensitive information to a user, the system comprising:
    a server system programmed to:
       send a communication to the user, the communication comprising instructions for the user to consent to electronic delivery of the sensitive information;
       receive the consent from the user;
       store the received consent; and
       cause the sensitive information to be sent to the user.

15. The system as recited in claim 14, wherein the communication comprises disclosure information regarding electronic delivery of sensitive information.

16. The system as recited in claim 14, wherein the communication comprises a message sent over a network.

17. The system as recited in claim 14, wherein the communication comprises a computer readable device.

18. The system as recited in claim 14, 16, or 17 wherein the communication comprises a link which the user can follow to indicate consent.

19. The system as recited in claim 14, 16, or 17, wherein the communication comprises a link which points to a document containing sensitive information.

20. The system as recited in claim 14, 16, 17, or 18, wherein a user's ability to access sensitive information is recorded.

21. The system as recited in claim 14, wherein:
    the server system is further operative to:
       cause a consent request form to be sent to a first client system.

22. The system as recited in claim 21, wherein:
    the first client system is operative to:
       receive the consent request form from the server system;
       display the consent request form;
       accept data from the user for at least one field in the consent request form; and
       send the accepted data to the server system.

23. The system as recited in claim 21 or 22, wherein the server system and first client system communicate over a computer network.

24. The system as recited in claim 22, wherein:
the server system is further operative to:
determine whether the data received from the first client system indicates consent to electronically send sensitive information to the user; and
if the received information indicates consent, electronically send sensitive information to the user.

25. The system as recited in claim 24, wherein the step of electronically sending sensitive information comprises at least one of:
(i) sending a first e-mail message to a destination address associated with the user, the first e-mail message including a URL pointing to the sensitive information; and
(ii) sending a second e-mail message to the destination address associated with the user, the second e-mail message including the sensitive information.

26. A computer program product comprising:
a computer readable medium;
computer program instructions on the computer-readable medium, wherein the computer program instructions, when executed by a computer, direct the computer to perform a method of obtaining consent to electronically send sensitive information to a user, the method comprising:
requesting the consent from the user;
receiving the consent from the user; and
storing the received consent.

27. The computer program product as recited in claim 26, the method further comprising:
causing a consent request form to be sent to a first client system.

28. The computer program product as recited in claim 27, wherein:
the first client system is operative to:
receive the consent request form from the server system;
display the consent request form;
accept data from the user for at least one field in the consent request form; and
send the accepted data to the server system.

29. The computer program product as recited in claim 28, the method further comprising:
determining whether data received from a first client system indicates consent to electronically send sensitive information to the user; and
if the received information indicates consent, electronically sending sensitive information to the user.

30. The computer program product as recited in claim 28, wherein the step of electronically sending sensitive information comprises at least one of:
(i) sending a first e-mail message to a destination address associated with the user, the first e-mail message including a URL pointing to the sensitive information; and
(ii) sending a second e-mail message to the destination address associated with the user, the second e-mail message including the sensitive information.

31. A computer-implemented method of obtaining consent from a user on a first computer for electronic delivery of sensitive information, the computer-implemented method comprising:

displaying, on the first computer, a consent form having at least one field to be completed with data from the user;
transmitting the data in the at least one completed field from the first computer to a second computer;
receiving, at the second computer, the transmitted data; and
storing the received data in the second computer, the received data being associated with the user.

32. The computer-implemented method of claim 31, wherein the consent form is an HTML document.

33. The computer-implemented method of claim 31, wherein the information in the at least one completed field is transmitted over a computer network.

34. A computer-implemented method of obtaining consent for electronic delivery of sensitive information the method comprising:
identifying a user;
obtaining the user's consent to receive the sensitive information in electronic format;
determining whether the user is capable of receiving the sensitive information in electronic format; and
providing the user with access to the sensitive information in electronic format.

35. The computer implemented method of claim 34 further comprising:
requesting the user to consent to receiving additional sensitive information electronically.

36. The computer-implemented method of claim 34, further comprising:
maintaining a record that indicates at least one of the following:
(a) the user was provided access to the sensitive information; and
(b) the user was able to access the sensitive information.

37. The computer-implemented method of claim 34, wherein access to the sensitive information comprises at least one of:
(a) a URL displayed on a computer of the user, the URL pointing to the sensitive information;
(b) the user providing an e-mail address to which an e-mail message, with the sensitive information, will be sent; and
(c) printing a paper version of the sensitive information at the user's location.

38. A computer data signal embodied in a computer communications medium, the computer data signal comprising:
a first portion identifying sensitive information located on a server system; and
a destination address identifying a destination of the computer data signal.

39. The computer data signal as recited in claim 38, further comprising:
a second portion identifying the server system.

40. The computer data signal as recited in claim 38, wherein the sensitive information comprises a prospectus for a mutual fund.

41. The computer data signal as recited in claim 38, wherein the computer communications medium comprises a carrier wave.

42. A computer-readable signal transmitted on a computer-readable medium, the computer readable signal comprising computer program instructions that, when executed by a computer, direct the computer to perform a method of obtaining consent to electronically send sensitive information to a user, the method comprising:
  requesting the consent from the user;
  receiving the consent from the user; and
  storing the received consent.

43. The computer-readable signal as recited in claim 42, the method further comprising:
  causing a consent request form to be sent to a first client system.

44. The computer-readable signal as recited in claim 43, wherein:
  the first client system is operative to:
    receive the consent request form from the server system;
    display the consent request form;
    accept data from the user for at least one field in the consent request form; and
    send the accepted data to the server system.

45. The computer-readable signal as recited in claim 42, the method further comprising:
  determining whether data received from a first client system indicates consent to electronically send sensitive information to the user; and
  if the received information indicates consent, electronically sending sensitive information to the user.

46. The computer-readable signal as recited in claim 44, wherein the step of electronically sending sensitive information comprises at least one of:
  (i) sending a first e-mail message to a destination address associated with the user, the first e-mail message including a URL pointing to the sensitive information; and
  (ii) sending a second e-mail message to the destination address associated with the user, the second e-mail message including the sensitive information.

47. A computer-implemented method of providing access to a sensitive information record stored in a sensitive information database to a user, the method comprising:
  (a) locating, in a sensitive information database, a sensitive information record to be provided; and
  (b) sending a hyperlink to the user pointing to the sensitive information record.

48. A method of providing access to a sensitive information database, the method comprising:
  under control of a sending system:
    sending a sensitive information request message; and
  under control of an associating system:
    receiving the sensitive information request message from the sending system,
    associating a sensitive information record with the contents of the sensitive information request message,
    identifying a destination address based on the sensitive information request message,
    creating a hyperlink pointing to the sensitive information record in the sensitive information database, and
    sending the hyperlink to the destination address.

49. The method of claim 48, wherein the destination address is located at a receiving system and the hyperlink is transmitted from the associating system to the receiving system via the Internet.

50. The method of claim 48, wherein the destination address is located at a receiving system, the method further comprising:
  under control of the receiving system:
    receiving the hyperlink from the associating system, and
    accessing the associating system via the hyperlink.

51. The method of claim 50, further comprising:
  under control of the associating system:
    detecting an access to the associating system by the receiving system via the hyperlink;
    determining whether or not the hyperlink is valid; and
    when the hyperlink is determined to be valid:
      identifying the sensitive information record from the hyperlink,
      retrieving the sensitive information record from the sensitive information database, and
      causing the sensitive information record to be displayed on the second client system.

52. A computer-implemented method of providing sensitive information stored in a sensitive information database, the method comprising:
  receiving a message that identifies specific sensitive information to be retrieved;
  locating, in the sensitive information database, a sensitive information record comprising the specific sensitive information,
  creating a hyperlink pointing to the sensitive information record; and
  sending the hyperlink to a destination address.

53. The computer-implemented method of claim 52, further comprising:
  receiving an access request to access the sensitive information database via a received hyperlink;
  determining whether the received hyperlink is valid; and
  when the received hyperlink is determined to be valid, identifying the sensitive information record from data in the received hyperlink and providing the sensitive information record to a source of the received hyperlink.

54. A system for sharing sensitive information data stored in a sensitive information database, the system comprising:
  a sending system operative to:
    search the sensitive information database,
    identify a specific sensitive information record located within the sensitive information database,
    identify a destination address, and
    send a sensitive information request message with respect to the specific sensitive information record and destination address; and
  a storing system operative to:
    receive the sensitive information request message,
    determine the specific sensitive information record and destination address from the sensitive information request message,
    create a hyperlink pointing to the specific sensitive information record in the sensitive information database, and
    send the hyperlink to the destination address.

55. The system of claim 54, wherein the sending system communicates with the storing system over the Internet.

56. The system of claim 54, wherein the sending system communicates with the storing system over an intranet.

57. A computer program product comprising:
  a computer-readable medium; and
  computer program instructions on the computer-readable medium, wherein the computer program instructions, when executed by a computer, direct the computer to perform a method of providing sensitive information data stored in a sensitive information database, the method comprising:

receiving a sensitive information request message, identifying a specific sensitive information record and a destination address in the sensitive information request message, creating a hyperlink pointing to the specific sensitive information record, and sending the hyperlink to the destination address.

58. The computer program product of claim 57, wherein the method further comprises at least one of:

receiving the sensitive information request message over the Internet; and sending the hyperlink over the Internet.

59. A system for providing sensitive information data stored in a sensitive information database, the system comprising:

a database server system operative to:

receive a sensitive information request message;

determine a specific sensitive information record and destination address from the sensitive information request message;

create a hyperlink pointing to the specific sensitive information record in a sensitive information database; and send the hyperlink to the destination address.

60. The system of claim 59, wherein a first client system sends the sensitive information request message to the database server system over the Internet.

61. The system of claim 60, wherein a first client system sends the sensitive information request message to the database server system over an intranet.

* * * * *